(12) United States Patent
Chiang

(10) Patent No.: US 7,524,181 B2
(45) Date of Patent: Apr. 28, 2009

(54) BLOWING ASSEMBLY

(76) Inventor: Fu-Chuan Chiang, No. 90, Dongcheng Rd., North Dist., Taichung (TW)

( * ) Notice: Subject to any disclaimer, the term of this patent is extended or adjusted under 35 U.S.C. 154(b) by 470 days.

(21) Appl. No.: 11/488,481

(22) Filed: Jul. 18, 2006

(65) Prior Publication Data
US 2008/0031994 A1 Feb. 7, 2008

(51) Int. Cl.
*B29C 49/20* (2006.01)
(52) U.S. Cl. .................. 425/503; 425/525; 425/534; 425/538; 425/539
(58) Field of Classification Search ............... 425/503, 425/522, 525, 126.1, 534, 537, 538, 539; 264/516
See application file for complete search history.

(56) References Cited

U.S. PATENT DOCUMENTS

| | | | | |
|---|---|---|---|---|
| 4,501,548 A | * | 2/1985 | Jahnel ................... | 425/503 |
| 4,952,133 A | * | 8/1990 | Hasegawa et al. ........... | 425/503 |
| 5,167,970 A | * | 12/1992 | Yoshino et al. ............. | 425/525 |
| 5,338,503 A | * | 8/1994 | Yanagisawa et al. ........ | 264/516 |
| 6,444,158 B1 | * | 9/2002 | Grob et al. ................. | 264/516 |

* cited by examiner

*Primary Examiner*—Robert B Davis
(74) *Attorney, Agent, or Firm*—Jackson Walker, LLP

(57) ABSTRACT

A blowing assembly is connected to a body of a blowing mechanism and has a bracket, a driving device, a mold assembly and a peripheral-supplying device. The bracket is connected to the body of the blowing mechanism and has a frame, an actuating device and a transmitting device. The frame is connected to the body of the blowing mechanism and has multiple mounting shafts, a mounting board, a second moving board and a primary moving board. The driving device is mounted on the second moving board and has a motor, a driven device and a threaded rod. The mold assembly is connected to the bracket and has a primary mold and two second molds. The peripheral-supplying device is connected to the body of the blowing mechanism over the bracket and has two mounts located at two sides of the second moving board.

7 Claims, 6 Drawing Sheets

BLOWING ASSEMBLY

BACKGROUND OF THE INVENTION

1. Field of the Invention

The present invention relates to a blowing assembly, and more particularly to a blowing assembly that is used on a blowing mechanism and can reduce the cost for manufacturing a plastic bottle.

2. Description of Related Art

With reference to FIG. 6, a conventional blowing mechanism (80) is used to manufacture a plastic bottle with an open end and a close end and comprises a body (86), an annular track (81), multiple bottle seats (82) and a blowing assembly.

The body (86) has a primary base, a second base and multiple mounting shafts. The bases are respectively mounted movably on the mounting shafts and face each other and each base has an inner surface.

The annular track (81) moveably extends between the inner surfaces of the bases in an endless circle and has a bottom, an inner side and an outer side. The inner side of the annular track (81) is adjacent to the inner surface of the primary base and the outer side of the annular track (81) is adjacent to the inner surface of the second base.

The bottle seats (82) are mounted respectively in the bottom of the annular track (81) and are used to hold the open ends of the plastic bottles.

The blowing assembly is connected to the body (86) and has a primary mold (85), a second mold (83) and a handle-supplying device (84). The primary mold (85) is mounted on the inner surface of the primary base and below the annular track (81) and has two first cavities. The second mold (83) is mounted on the inner surface of the second base and has two second cavities facing respectively to the first cavities in the primary mold (85). When the bases are moved along the mounting shafts, the molds (85, 83) will contact each other and the corresponding cavities will hold a plastic bottle in the bottle seat (82). The handle-supplying device (84) is connected to the body (86) over the second mold (83) to supplying peripherals such as handles to the second cavities of the second mold (83).

The manufacturing process of the conventional blowing mechanism (80) is firstly moving the annular track (81) to apply the plastic bottles between the primary mold (85) and the second mold (83) and corresponding to the cavities. Then, the handle-supplying device (84) supplies handles into the second cavities in the second mold (83). The bases are moved to close to each other along the mounting shafts to combine the molds (83, 85) and to attach the handles onto the plastic bottles.

Therefore, the conventional blowing mechanism (80) takes times for supplying handles into the second cavities of the second mold (83) with the handle-supplying device (84), and this will decrease the efficiency of manufacturing plastic bottles and increase the cost for manufacturing plastic bottles.

Therefore, the invention provides a blowing assembly to mitigate or obviate the aforementioned problems.

SUMMARY OF THE INVENTION

The main objective of the present invention is to provide a blowing assembly that can reduce the cost of manufacturing a plastic bottle.

The blowing assembly is connected to a body of a blowing mechanism and has a bracket, a driving device, a mold assembly and a peripheral-supplying device. The bracket is connected to the body of the blowing mechanism and has a frame, an actuating device and a transmitting device. The frame is connected to the body of the blowing mechanism and has multiple mounting shafts, a mounting board, a second moving board and a primary moving board. The driving device is mounted on the second moving board and has a motor, a driven device and a threaded rod. The mold assembly is connected to the bracket and has a primary mold and two second molds. The peripheral-supplying device is connected to the body of the blowing mechanism over the bracket and has two mounts located at two sides of the second moving board.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
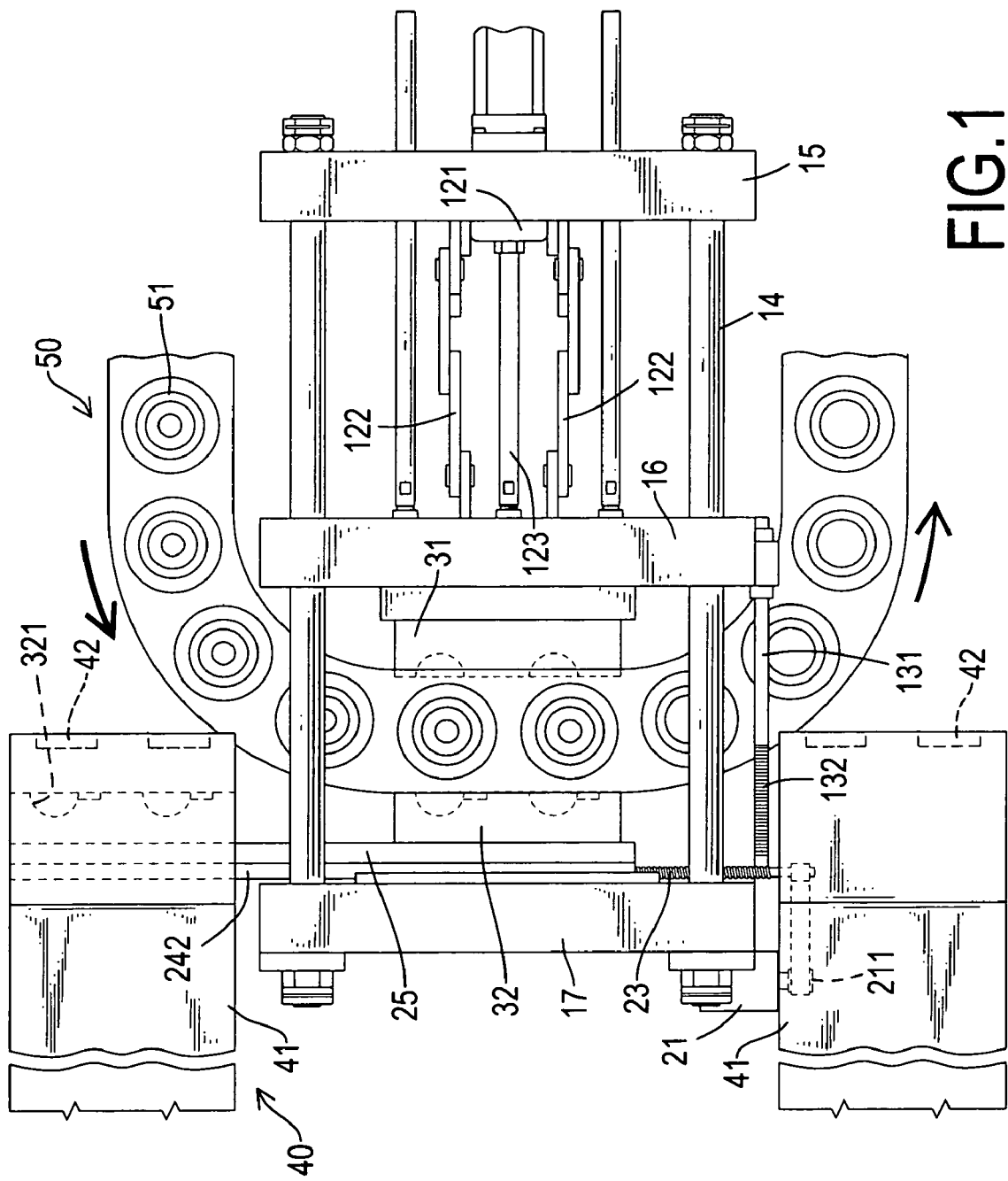
FIG. 1 is a top view of a blowing assembly in accordance with the present invention.
Figure 2:
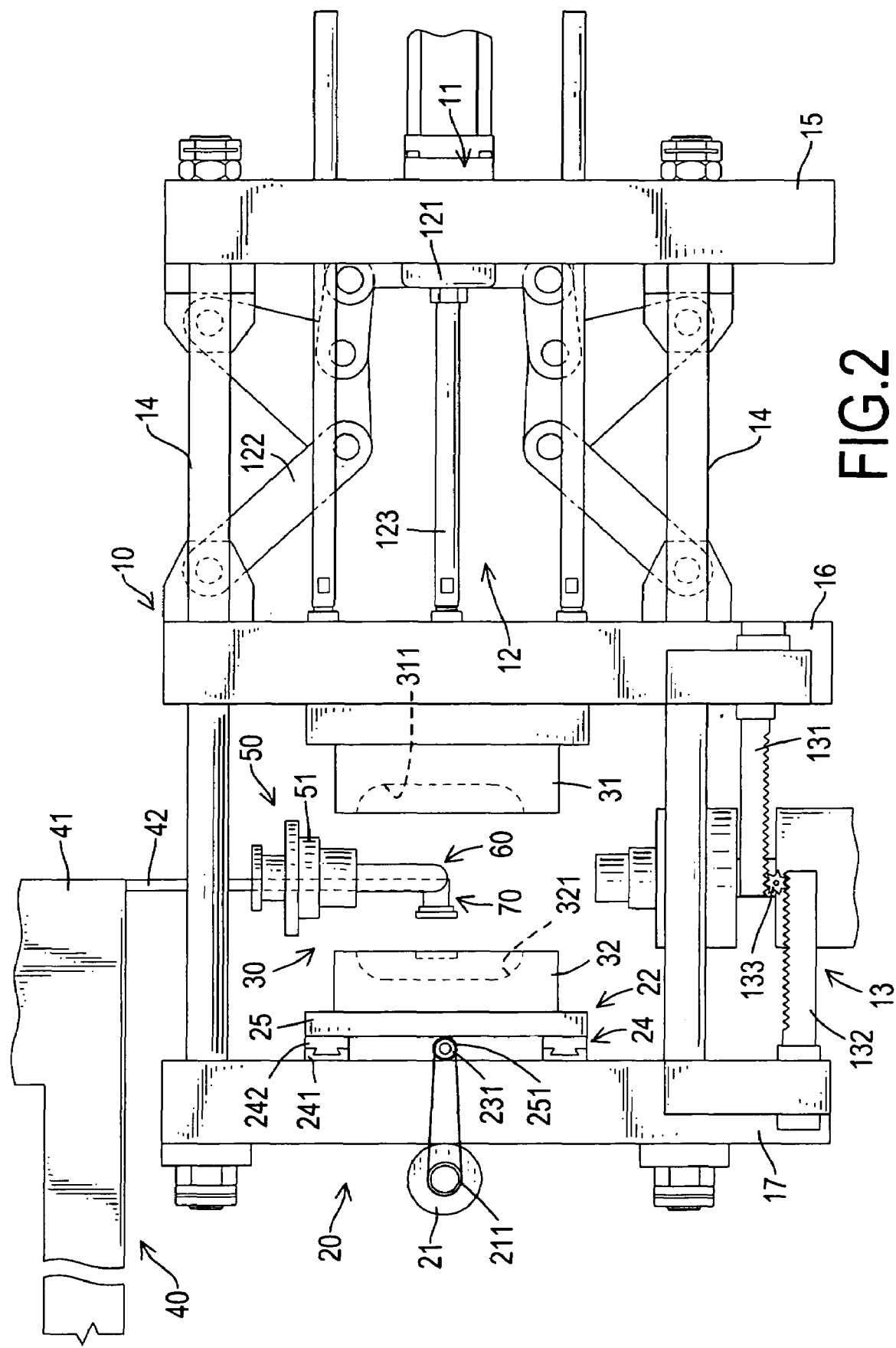
FIG. 2 is a side perspective view of the blowing assembly in FIG. 1.
Figure 3:
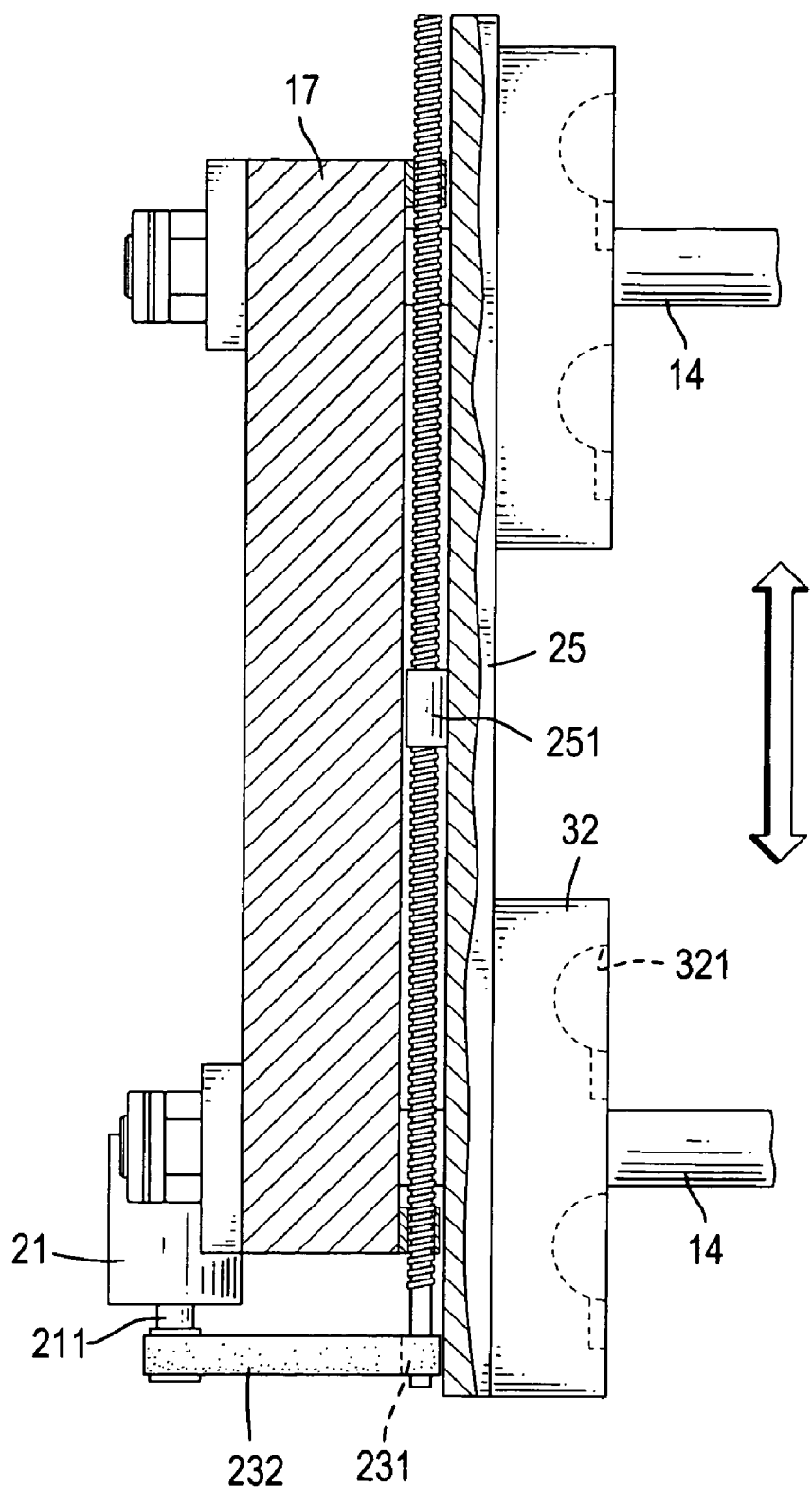
FIG. 3 is an enlarged top view in partial section of the blowing assembly in FIG. 1.

With reference to FIGS. 1 to 3, a blowing assembly in accordance with the present invention is used on a blowing mechanism having a body and an annular track (50) with multiple seats (51) and multiple bottles (60) mounting in the seats (51), and the blowing assembly is connected to the body of the blowing mechanism and has a bracket (10), a driving device (20), a mold assembly (30) and a peripheral-supplying device (40).

The bracket (10) is connected to the body of the blowing mechanism, is mounted across the annular track (50) and comprises a frame (11), an actuating device (12) and a transmitting device (13). The frame (11) is connected to the body of the blowing mechanism and has multiple mounting shafts (14), a mounting board (15), a second moving board (17) and a primary moving board (16).

The mounting shafts (14) are mounted across the annular track (50) and each mounting shaft (14) has a proximal end and a distal end. The mounting board (15) is solidly mounted on the proximal ends of the mounting shafts (14) and has an inner surface.

The second moving board (17) is movably connected to the distal ends of the mounting shafts (14) and has an inner surface, an outer surface and a sidewall. The primary moving board (16) is movably mounted on the mounting shafts (14) between the mounting board (15) and the second moving board (17) and has an inner surface, an outer surface and a sidewall. The inner surface of the primary moving board (16) is faced to the inner surface of the second moving board (17).

The actuating device (12) is connected to the frame (11), is used to push the primary moving board (16) to move along the shafts (14) and has a mounting seat (121), an actuating post (123) and multiple connecting beams (122). The mounting seat (121) is mounted on the inner surface of the mounting board (15).

The actuating post (123) is movably connected to the mounting seat (121) and has a connecting end. The connecting end of the actuating post (123) is connected to the outer surface of the primary moving board (16) to push and pull the primary moving board (16). The connecting beams (122) are connected between the outer surface of the primary moving board (16) and the inner surface of the mounting board (15).

With reference to FIGS. 1 and 2, the transmitting device (13) is connected to the moving boards (16, 17) and has an upper rack (131), a lower rack (132) and a turning pulley (133). The upper rack (131) is mounted on the sidewall of the primary moving board (16) and has a bottom and multiple teeth. The teeth are formed on the bottom of the upper rack (131).

The lower rack (132) is mounted on the sidewall of the second moving board (17) below the upper rack (131) and has a top and multiple teeth. The teeth are formed on the top of the lower rack (132) and face to the teeth on the upper rack (131). The turning pulley (133) is engaged with the teeth on the upper rack (131) and the lower rack (132).

Figure 4:
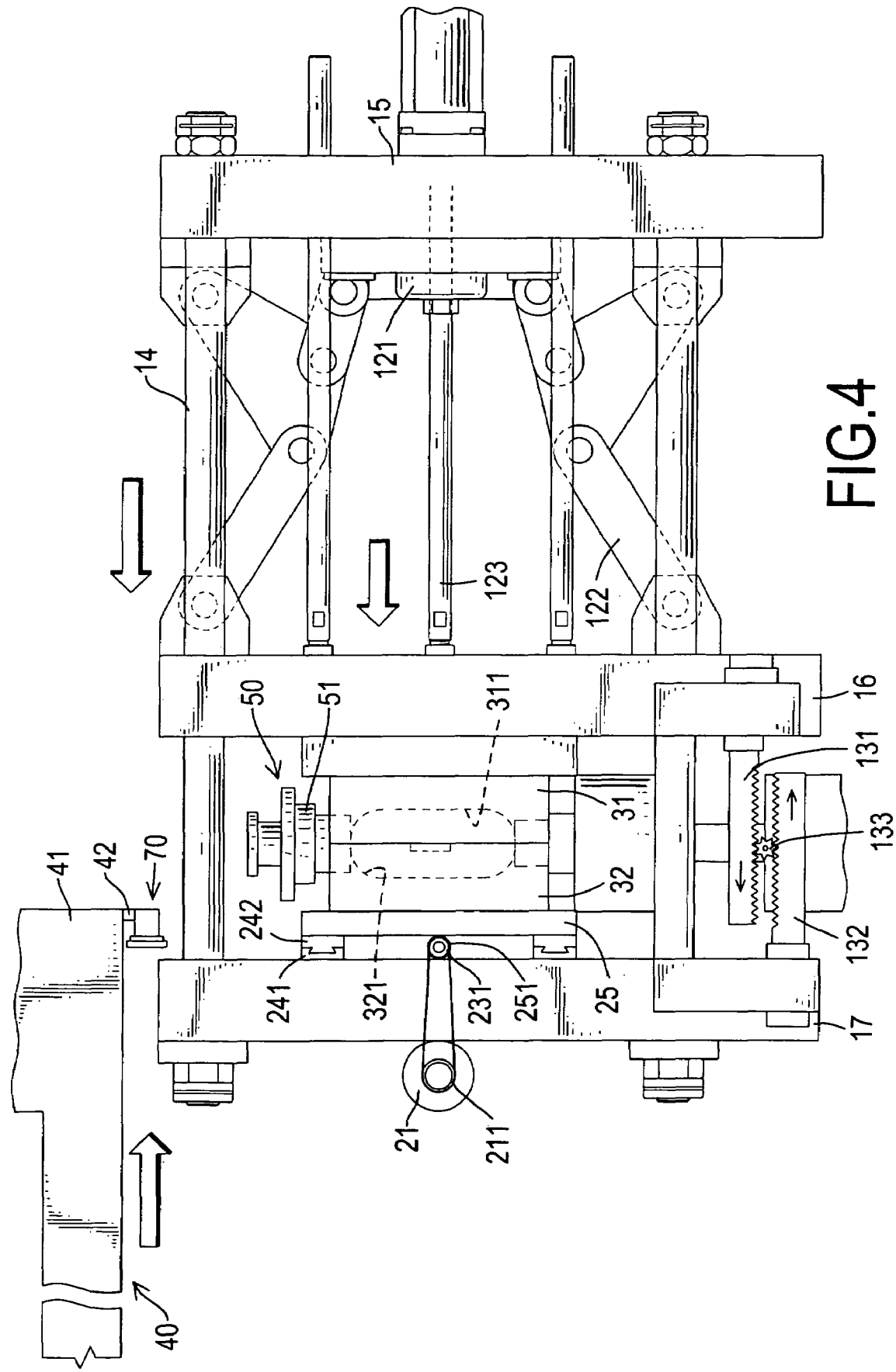
FIG. 4 is an operational side view of the blowing assembly in FIG. 1.

With reference to FIGS. 2 and 4, when the actuating post (123) pushes the primary moving board (16) to move relative to the mounting board (15), the turning pulley (133) is turned by the upper rack (131) and moves the lower rack (132) toward the upper rack (131) with the engagement of the teeth. Then, the second moving board (17) can move toward the primary moving board (16) along the shafts (14).

With reference to FIGS. 1 to 3, the driving device (20) is mounted on the second moving board (17) and has a motor (21), a driven device (22) and a threaded rod (23). The motor (21) is connected to the outer surface of the second moving board (17) and has a driving shaft (211). The driving shaft (211) is axially protruded from the motor (21).

The driven device (22) is mounted on the second moving board (17), is connected to the motor (21) and has two rail assemblies (24) and a base (25). The rail assemblies (24) are respectively mounted on the inner surface of the second moving board (17) and each rail assembly (24) has an inner track (241) and an outer track (242). The inner track (241) of the rail assembly (24) is immovably attached on the second moving board (17). The outer track (242) of the rail assembly (24) is slidably engages with the inner track (241).

The base (25) is securely mounted on the rail assemblies (24) and has a rear side, a front side and a mounting sleeve (251). The rear side of the base (25) is connected to the outer tracks (242) of the rail assemblies (24). The mounting sleeve (251) is hollow, is formed on the rear side of the base (25) between the rail assemblies (24) and has an inner thread.

The threaded rod (23) is screwed and engaged with the inner thread of the mounting sleeve (251) in the base (25), is connected to the motor (21) and has an outer end, a transmitting pulley (231) and a belt (232). The threaded rod (23) is extended through the mounting sleeve (251) and the outer end of the threaded rod (23) corresponds to the driving shaft (211) of the motor (21). The transmitting pulley (231) is mounted on the outer end of the threaded rod (23). The belt (232) is mounted around the driving shaft (211) and the transmitting pulley (231).

Figure 5:
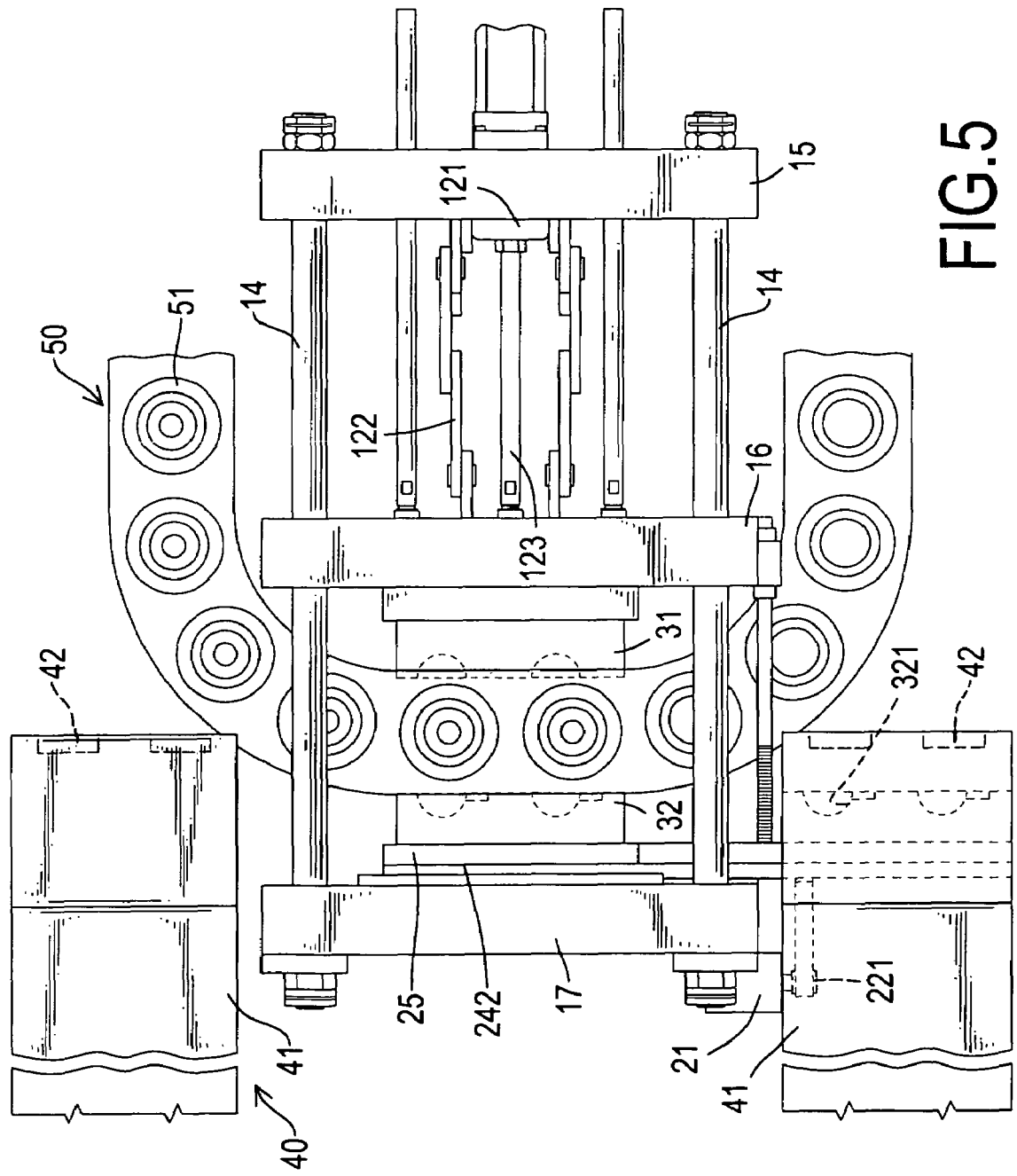
FIG. 5 is an operational top view of the blowing assembly in FIG. 1.
Figure 6:
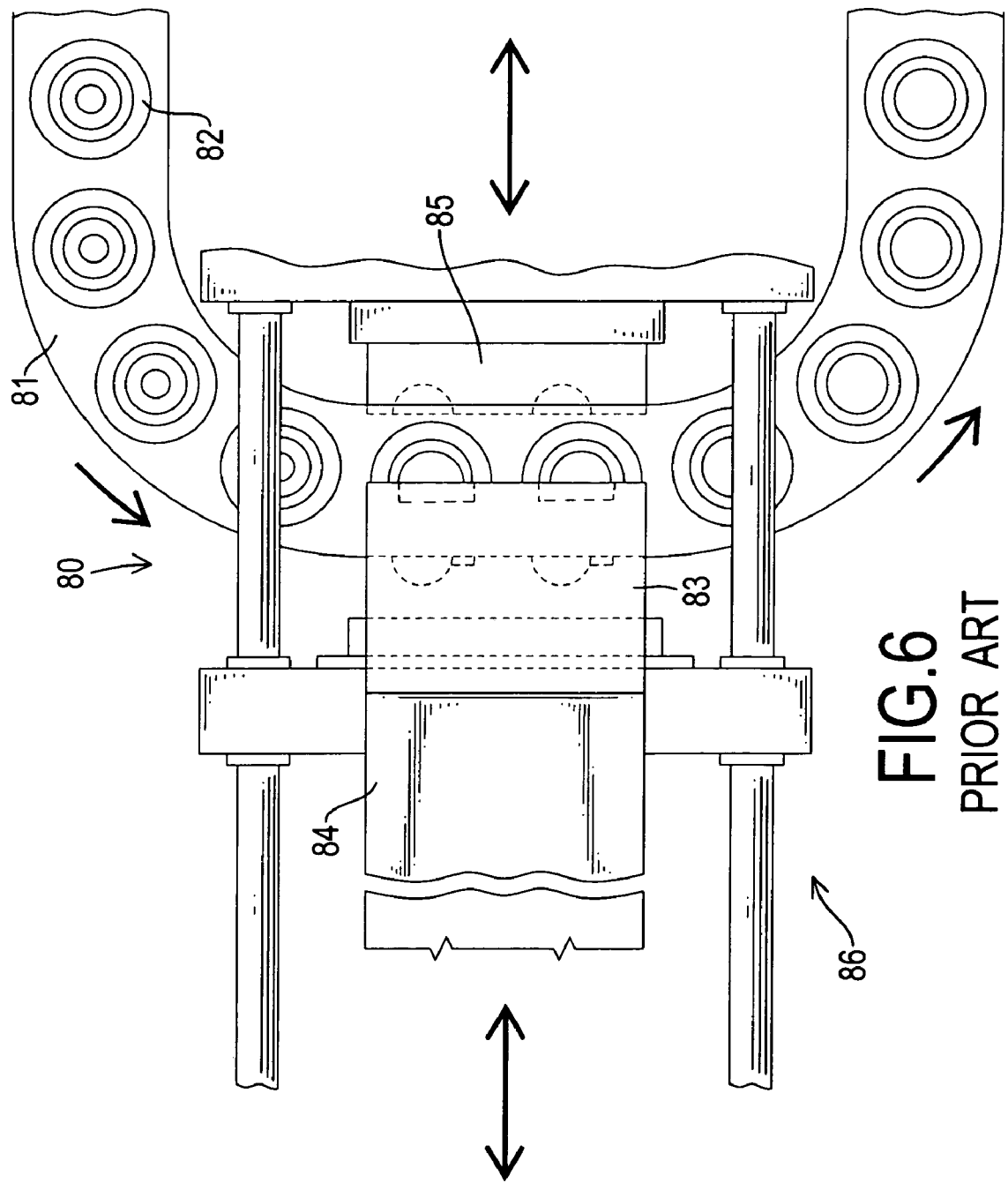
FIG. 6 is a top view of a conventional blowing assembly in accordance with the prior art.

With reference to FIG. 3, when the motor (21) is switched on and the driving shaft (211) is turning, the threaded rod (23) will be rotated with the transmission of the belt (232) and the transmitting pulley (231) threaded rod. Consequently, the mounting sleeve (251) will be moved along the threaded rod (23) with the engagement of the thread, then the base (25) is moved along the rail devices (24) as shown in FIGS. 3 and 5.

With reference to FIGS. 1 and 2, the mold assembly (30) is connected to the bracket (10) and has a primary mold (31) and two second molds (32). The primary mold (31) is mounted on the inner surface of the primary moving board (16) and has two primary cavities (311). The primary cavities (311) are formed in the primary mold (31) to hold the plastic bottles (60) on the bottle seat (51).

The second molds (32) are mounted on the front side of the base (25) and selectively face to the primary mold (31) with the movement of the base (25), and each second mold (32) has two second cavities (321). The second cavities (321) are formed in the second mold (32) to hold the plastic bottles (60) on the bottle seat (51) in cooperation with the primary cavities (311).

With reference to FIGS. 1, 2 and 4, the peripheral-supplying device (40) is connected to the body of the blowing mechanism over the bracket (10) and has two mounts (41) located respectively at two sides of the second moving board (17). The mounts (41) each has two supplying arms (42) corresponding to the second cavities (321) in the second molds (32). The supplying arms (42) can be moved up and down to put handles (70) into the second cavities (321) of the second molds (32).

With reference to FIGS. 1, 2 and 4, when the plastic bottles (60) are moved between the primary mold (31) and one of the second molds (32) with the bottle seats (51), the actuating post (123) of the actuating device (12) pushes the primary moving board (16) toward the second moving board (17). The turning pulley (133) is turned by the upper rack (131) and moves the lower rack (132) toward the upper rack (131). The second moving board (17) is moved toward the primary moving board (16) along the shafts (14) to make the primary mold (31) and the corresponding second mold (32) combined together. At this time, the other second mold (32) is moved to below one of the mounts (41) of the peripheral-supplying device (40), and the supplying arms (42) of the mount (41) are moved down and put handles (70) into the corresponding second cavities (321).

After the plastic bottles with the handles (70) are formed in the combined molds (31, 32), the actuating post (123) pulls the primary moving board (16) backward and toward the mounting board (15) to separate the primary mold (31) and the corresponding second mold (32).

With reference to FIGS. 3 and 5, the motor (21) is then switched on to rotate threaded rod (23) and the mounting sleeve (251) is moved along the threaded rod (23). Consequently, the base (25) is moved relative to the rail assemblies (24) to move the second mold (32) with handles (70) inside to face the primary mold (31) for another bottle forming process and the other second mold (32) to face the corresponding mount (41) for supplying handles (70) inside.

Therefore, the blowing assembly can manufacture the plastic bottle (60) with handles (70) continuously and does not need to wait the peripheral-supplying device (40) supplying the handles (70) in the second cavities (321) of the second mold (32). Such that the blowing assembly can provide a smooth manufacture process to increase the efficiency of and decrease the cost for manufacturing plastic bottles (60).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A blowing assembly for a blowing mechanism having a body and an annular track with multiple seats, and the blowing assembly adapted to be connected to the body of the blowing mechanism and comprising a bracket having
  a frame being adapted to be connected to the blowing mechanism and having
    multiple mounting shafts adapted for being mounted across the annular track and each mounting shaft having
      a proximal end; and
      a distal end;
    a mounting board being securely mounted on the proximal ends of the mounting shafts and having an inner surface;
    a second moving board being movably connected to the distal ends of the mounting shafts and having
      an inner surface;
      an outer surface; and
      a sidewall; and
    a primary moving board being movably mounted on the mounting shafts between the mounting board and the second moving board and having
      an inner surface being faced to the inner surface of the second moving board;
      an outer surface; and
      a sidewall;
  an actuating device being connected to the frame to move the primary moving board along the shafts; and
  a transmitting device being connected to the primary and second moving boards;
a driving device being mounted on the second moving board and having
  a motor connected to the outer surface of the second moving board and having a driving shaft axially protruded from the motor;
  a driven device being mounted on the second moving board, being connected to the motor and having
    two rail assemblies being mounted respectively on the inner surface of the second moving board; and
    a base being mounted on the rail assemblies and having a front side; and
  a threaded rod being connected to the base and the motor and having
    an outer end corresponding to the driving shaft of the motor;
    a transmitting pulley being mounted on the outer end of the threaded rod; and
    a belt being mounted around the driving shaft and the transmitting pulley;
a mold assembly being connected to the bracket and having
  a primary mold being mounted on the inner surface of the primary moving board and having two primary cavities being formed in the primary mold; and
  two second molds being mounted on the front side of the base and selectively facing to the primary mold with a movement of the base and each second mold having two second cavities to hold plastic bottles in cooperation with the primary cavities; and
a peripheral-supplying device being adapted to be connected to the body of the blowing mechanism and having two mounts located respectively at two sides of the second moving board, each mount has two supplying arms.

2. The blowing assembly as claimed in claim 1, wherein the actuating device has
  a mounting seat being mounted on the inner surface of the mounting board;
  an actuating post being movably connected to the mounting seat and having a connecting end connected to the outer surface of the primary moving board; and
  multiple connecting beams being mounted between the outer surface of the primary moving board and the inner surface of the mounting board.

3. The blowing assembly as claimed in claim 1, wherein the transmitting device has
  an upper rack being mounted on the sidewall of the primary moving board and having
    a bottom; and
    multiple teeth being formed on the bottom of the upper rack;
  a lower rack being mounted on the sidewall of the second moving board, located below the upper rack and having
    a top; and
    multiple teeth being formed on the top of the lower rack and faced to the teeth in the upper rack; and
  a turning pulley engaged with the teeth on the upper rack and the lower rack.

4. The blowing assembly as claimed in claim 1, wherein each rail assembly has
  an inner track being immovably attached on the second moving board; and
  an outer track being slidably engages with the inner track; and the base has
  a rear side connected to the outer tracks of the rail assemblies; and
  a mounting sleeve being hollow, being mounted on the rear side of the base between the rail assemblies and mounted around and screwed with the threaded rod.

5. The blowing assembly as claimed in claim 2, wherein the actuating device further has
  a mounting seat being mounted on the inner surface of the mounting board;
  an actuating post being movably connected to the mounting seat and having a connecting end connected to the outer surface of the primary moving board; and
  multiple connecting beams mounted between the outer surface of the primary moving board and the inner surface of the mounting board.

6. The blowing assembly as claimed in claim 5, wherein the transmitting device has
  an upper rack being mounted on the sidewall of the primary moving board and having
    a bottom; and
    multiple teeth being formed on the bottom of the upper rack;
  a lower rack mounted on the sidewall of the second moving board, located below the upper rack and having
    a top; and
    multiple teeth being formed on the top of the lower rack and faced to the teeth in the upper rack; and
  a turning pulley engaged with the teeth on the upper rack and the lower rack.

7. The blowing assembly as claimed in claim 6, wherein each rail assembly has
  an inner track being immovably attached on the second moving board; and
  an outer track being slidably engages with the inner track; and the base has
  a rear side being connected to the outer tracks of the rail devices; and a mounting sleeve being hollow, being mounted on the rear side of the base between the rail assemblies, and mounted around and screwed with the threaded rod.

* * * * *